United States Patent [19]

Sievel et al.

[11] Patent Number: 4,780,835
[45] Date of Patent: Oct. 25, 1988

[54] SYSTEM FOR DETECTING TAMPERING WITH A POSTAGE VALUE ACCOUNTING UNIT

[75] Inventors: Mark E. Sievel, Bethel; Ronald P. Sansone, Weston, both of Conn.

[73] Assignee: Pitney Bowes Inc., Stamford, Conn.

[21] Appl. No.: 877,593

[22] Filed: Jun. 23, 1986

Related U.S. Application Data

[63] Continuation-in-part of Ser. No. 813,459, Dec. 26, 1985, Pat. No. 4,760,532.

[51] Int. Cl.$^4$ .................... G06F 15/20; G06G 7/48
[52] U.S. Cl. .................... 364/550; 364/464.02; 340/825.32; 340/825.35; 380/25
[58] Field of Search .............. 364/464, 466, 401–405, 364/550; 235/380, 101; 380/3, 23, 25, 49; 340/825.32, 825.35

[56] References Cited

U.S. PATENT DOCUMENTS

| | | | |
|---|---|---|---|
| 4,410,961 | 10/1983 | Dlugos et al. | 364/466 X |
| 4,525,786 | 6/1985 | Crowley et al. | 364/466 |
| 4,588,991 | 5/1986 | Atalla | 380/25 X |
| 4,629,873 | 12/1986 | Stockburger et al. | 235/380 |
| 4,641,346 | 2/1987 | Clark et al. | 380/3 |
| 4,641,347 | 2/1987 | Clark et al. | 235/101 X |
| 4,660,221 | 4/1987 | Dlugos | 235/101 X |
| 4,675,669 | 6/1987 | Goldman | 235/380 X |
| 4,675,815 | 6/1987 | Kuroki et al. | 340/825.32 X |

*Primary Examiner*—Gary Chin
*Assistant Examiner*—Joseph L. Dixon
*Attorney, Agent, or Firm*—Peter Vrahotes; Melvin J. Scolnick; David E. Pitchenik

[57] ABSTRACT

A system for processing batch mail in which evidence of tampering with a postage value accounting unit is provided. The accounting unit cooperates with a printer to print postage and the zip code in bar code form on a mail piece. If there is evidence of tampering with the accounting unit, as incorrect zip code in bar code form is printed.

17 Claims, 6 Drawing Sheets

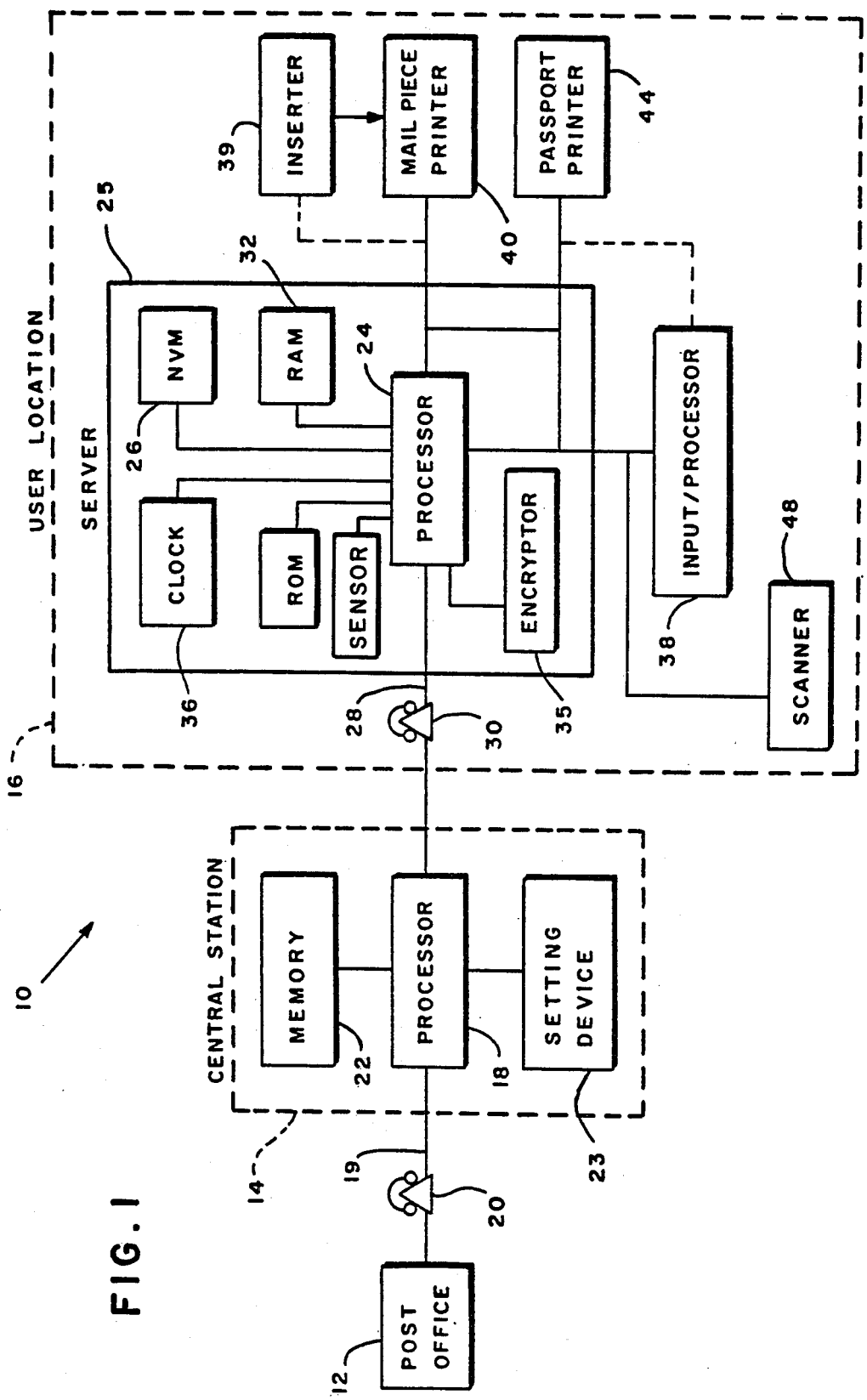

```
                                                     46
   ┌──────────────────────────────────────────┐
   │ ╬ PB  SERVER  NO. 7124  CUSTOMER  NAME   │
   │                                          │
   │   T.A. NO.      PIECE COUNT     REG. AM. │
   │   DATE          TIME            CLASS    │
   │   BATCH NO.     RUN NO.         POST. TOTAL │
   └──────────────────────────────────────────┘
```

FIG. 2

```
                                                    42
   ┌──────────────────────────────────────────────┐
   │                                  ┌─────────┐ │
   │  ADDRESSOR                       │US POSTAGE│ │
   │                                  │FIRST CLASS│
   │                              43  │  - PAID - │
   │                                  │PB SERVER #7124│
   │                                  └─────────┘ │
   │                                              │
   │    22¢101885*C2J2.743T56                     │
   │    JOHN J. DOE                         47a   │
   │    TAIL SPIN ROAD                            │
   │    WAXTON CT. 06790-0001                     │
   │                                              │
   │                      ‖‖‖‖‖‖‖‖‖‖‖‖‖‖‖‖‖‖‖‖‖‖  │
   └──────────────────────────────────────────────┘
```

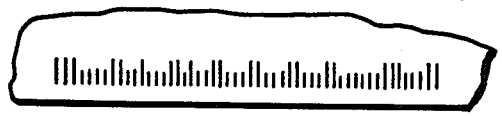

FIG. 3B

SYSTEM FOR DETECTING TAMPERING WITH A POSTAGE VALUE ACCOUNTING UNIT

RELATED CASES

This application is a continuation-in-part application of copending application having Ser. No. 813,459, filed Dec. 26, 1985 now U.S. Pat. No. 4,760,532 and entitled "MAILING SYSTEM WITH POSTAGE VALUE TRANSFER AND ACCOUNTING CAPABILITY".

Subject matter similar to the subject matter contained in the instant application may be found in U.S. patent application entitled "POSTAGE AND MAILING INFORMATION APPLYING SYSTEM" by Ronald Sansone and et al, filed Aug. 6, 1985, having Ser. No. 762,994 now U.S. Pat. No. 4,725,718 and assigned to the assignee of the instant application.

BACKGROUND OF THE INVENTION

Certain organizations dispatch large amounts of mail on a periodic basis. Examples of such organizations are: banking institutions, utility companies, insurance companies, credit companies, and the like. With such large quantities, these mail senders normally pre-package and pre-sort their mail and are given a lower postage rate by the postal service because of the time saved by the postal service. There are generally two ways in which such mail senders apply postage to their mail. The most common way is by use of a postage meter which is leased by the mail sender from a postage meter manufacturer with which the amount of postage required is applied to each mail piece. Inserter systems have been developed whereby inserts may be place into an envelope, the envelope may be sealed, addressed and have a postage indicia applied thereto. The mail pieces may be weighed on the fly or individual weighing may not be required if all the mail pieces are of like kind, i.e., only a sample mail piece need be weighed. Additionally, the weight can be calculated based upon a knowledge of the inserts to be processed. These acts of processing mail may be performed at a relatively high rate of speed.

A second method of mailing large quantities of mail pieces is the permit mail system. In such a system, the mail sender places a permit number on the mail pieces and prepares a manifest listing that shows the type and number of mail pieces being mailed on each occasion and the postage required. All the mail pieces are generally of the same type and weight.

With both such systems, inspection at the site of the mail sender is required. In the case of the postage meter, the lessor of the postage meter, i.e., the postage meter manufacturer, is required by law to inspect the postage meter at least twice a year to ensure that there is no evidence of tampering with the postage meter that will indicate an attempt to obtain unauthorized postage. In the case of permit mail, large quantities of the same type of mail will be mailed at one time and the postal service will conduct an inspection to verify that the manifest listing accompanying the permit mail accurately accounts for the amount of postage due for the mail that has been processed by the postal service. This is accomplished through an inspection on the part of the postal service by examining the records of the mail sender on every occasion.

Obviously, each of these two systems has certain drawbacks. In the case of on-site inspection of postage meters, with the large number of postage meters in use by large mail senders it is an expensive matter for the inspection thereof. With regard to the permit mail system, the shortcoming lies in the need of the postal service to send a representative frequently to the various mail sender locations to assure that the mail sender is accurately accounting for the quantity of mail being sent. Such a scheme is not totally reliable as it relies upon on-site verification using the mail senders records which are not secure.

A system has been conceived whereby a mail sender will be able to send large quantities or batches of mail without the need of on-site inspections. This is accomplished by the mail sender having a secure accounting unit similar to a postage meter in which postage value is placed by a dispensing or central station. A statement accompanies each batch of mail which statement may include information relative to the mail and the amount of postage required to send the mail and the amount of postage value remaining with the mail sender. Communication between the central station and the mail sender allows postage value to be transferred to and from the mail sender by the central station and mailing and verification data to be sent to the central station from the mail sender. The mailing and verification data will be the same as that contained on the mailing statements that accompany the batches of mail. This system provides a central station for a large number of mail senders whereby the postal service is relieved of its obligation of having on-site inspections and the central station acts as a clearing house for the postal service through whom verification of postage can be conveniently and inexpensively achieved.

Human nature being what it is, there are those who attempt to tamper with postage meters or accounting units of the type described herein to obtain unauthorized postage. Such meters or units have access doors that allow servicing thereof. Wrongdoers, on occasion, will attempt to force open such access doors or gain access by other means to reset or bypass the accounting register contained therein. Schemes have been suggested in the past whereby a postage meter or other value printing device may be provided with interlocks to prevent a user from printing postage value upon tampering being detected. A review of such schemes is given in U.S. Pat. No. 4,506,344. Where one has variable printing capability, as is provided by the instant system, it is desirable that one be able to detect tampering without having to disable the device.

SUMMARY AND FEATURES OF THE INVENTION

In a mailing system where a mail sender is capable of sending large quantities of mail accompanied by a statement, a scheme has been devised whereby tampering with the accounting unit may be detected. The accounting unit is provided with a sensor, or sensors, that detect any tampering or attempt to tamper. The sensor will communicate this detection to a processor that will control the bar code printer that prints the zip code in bar code form on a mail piece. Upon detection of tampering, the bar code will be altered so as not to conform to postal regulations. Upon subsequent sorting of the mail pieces in a post office, the mail with invalid bar codes will be placed in a reject bin and the discovery of tampering would occur.

A feature of this invention is that security for a postage meter or accounting unit is provided while allowing a high speed, relatively inexpensive printer to be used for printing mail and postage information.

Another feature of the present invention is that a scheme for discovering tampering upon a postage meter or accounting unit is provided that needs no change in post office equipment.

Yet another feature of the present invention is the provision of a postage meter like device with enhanced security capability to enable the generation of bar codes that can be altered to evidence tampering with accounting equipment.

Still another feature of the invention is that security of an accountng register in a postage meter like device can be provided.

A further feature of the invention is that the evidencing of tampering is not apparent to the wrongdoer.

Another feature of this invention is the automatic prevention of the postal service from expending time and money processing, transporting and delivering mail produced from an accounting unit or postage meter upon which tampering has taken place.

BRIEF DESCRIPTION OF THE DRAWINGS

FIG. 1 is a block diagram of a batch mailing system with tampering detection features;

FIG. 2 is a plan view of an accounting statement that would accompany batch mail sent by the system of FIG. 1.;

FIG. 3A is a plan view of an envelope containing information that would be applied thereto by the system of FIG. 1;

FIG. 3B is the bar code portion of the envelope shown in FIG. 3A; and

DETAILED DESCRIPTION OF THE PREFERRED EMBODIMENT

Figure 4:
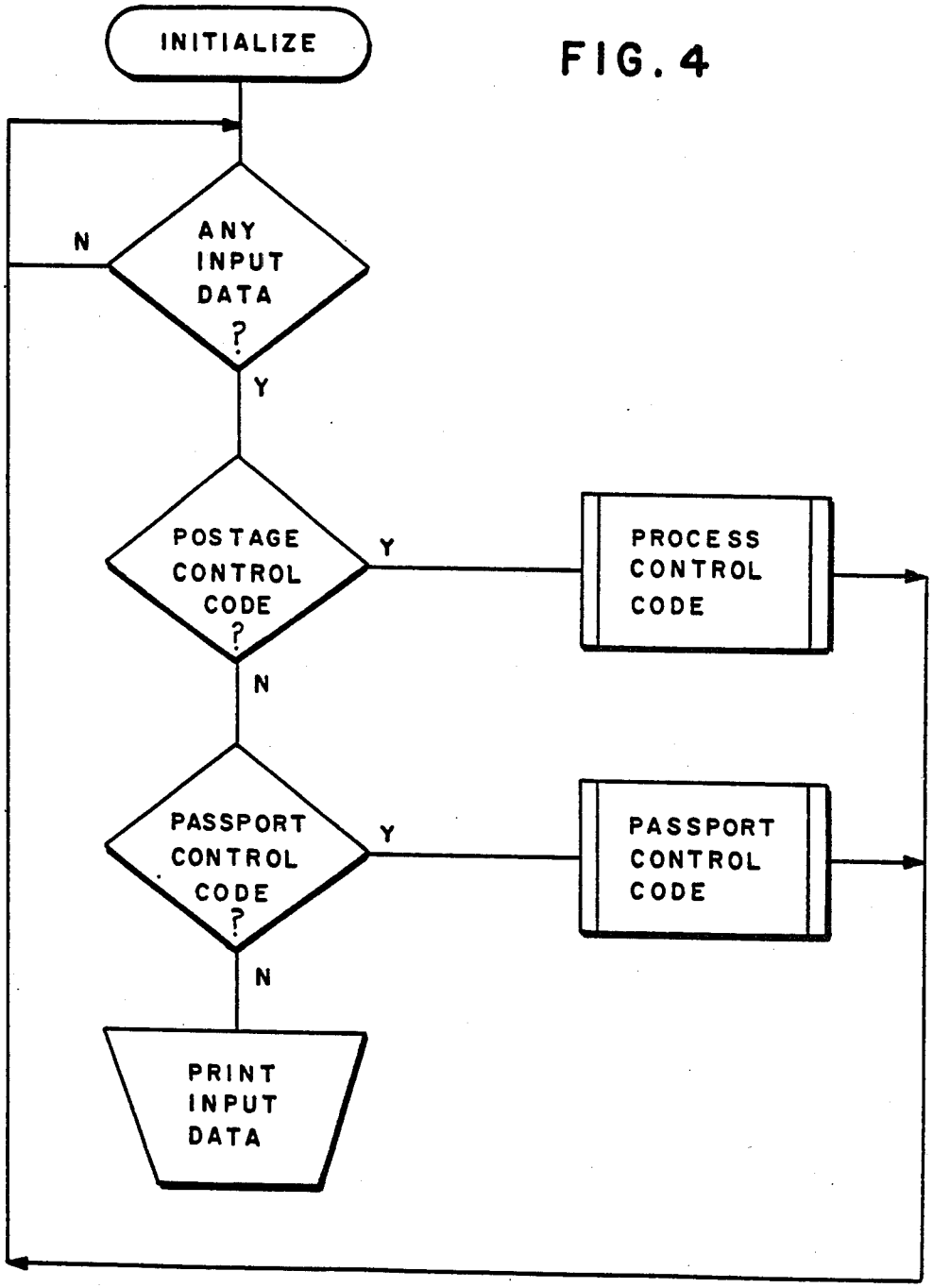
FIGS. 4-6 contain flow diagrams that describe the functions of the system shown in FIG. 1.
Figure 5A:
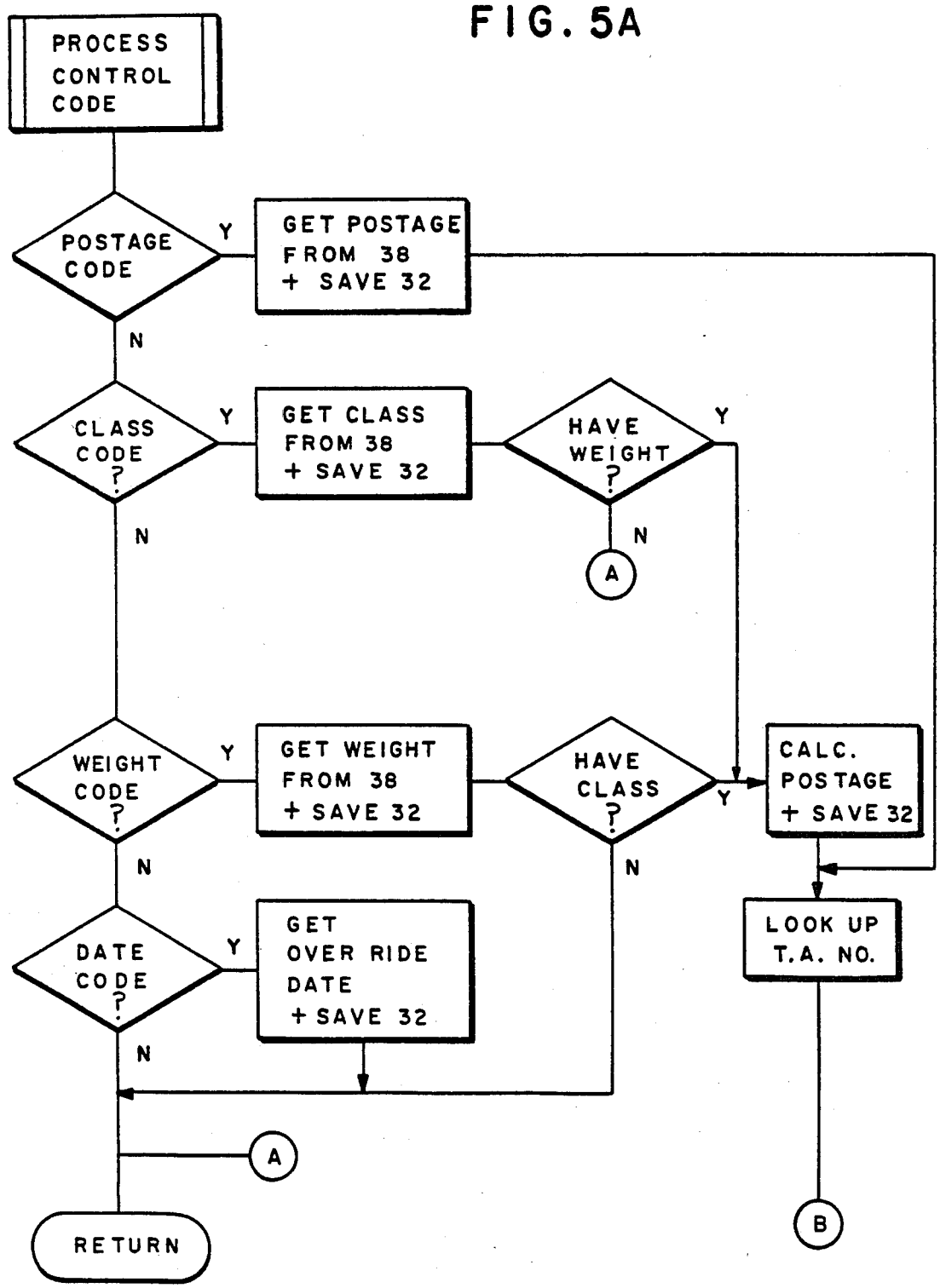
Figure 5B:
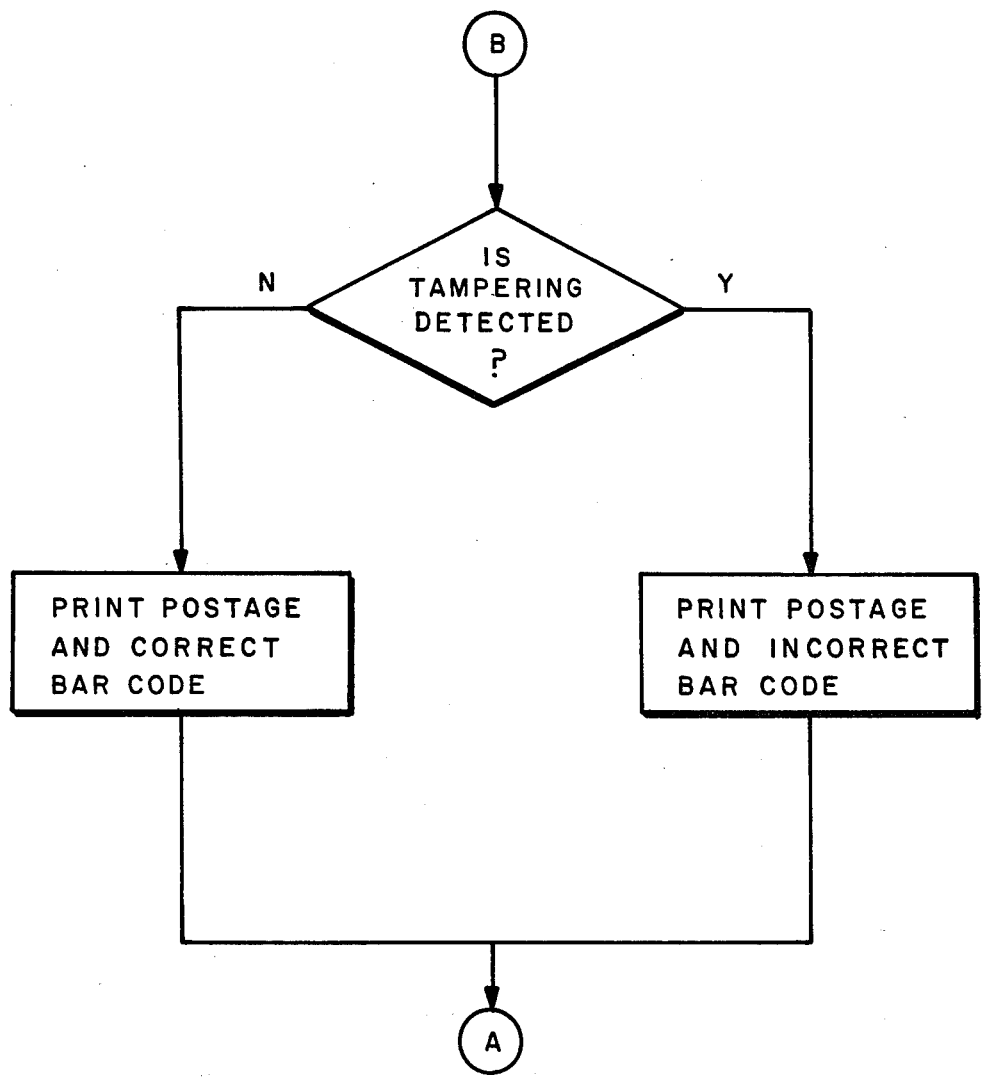
Figure 6:
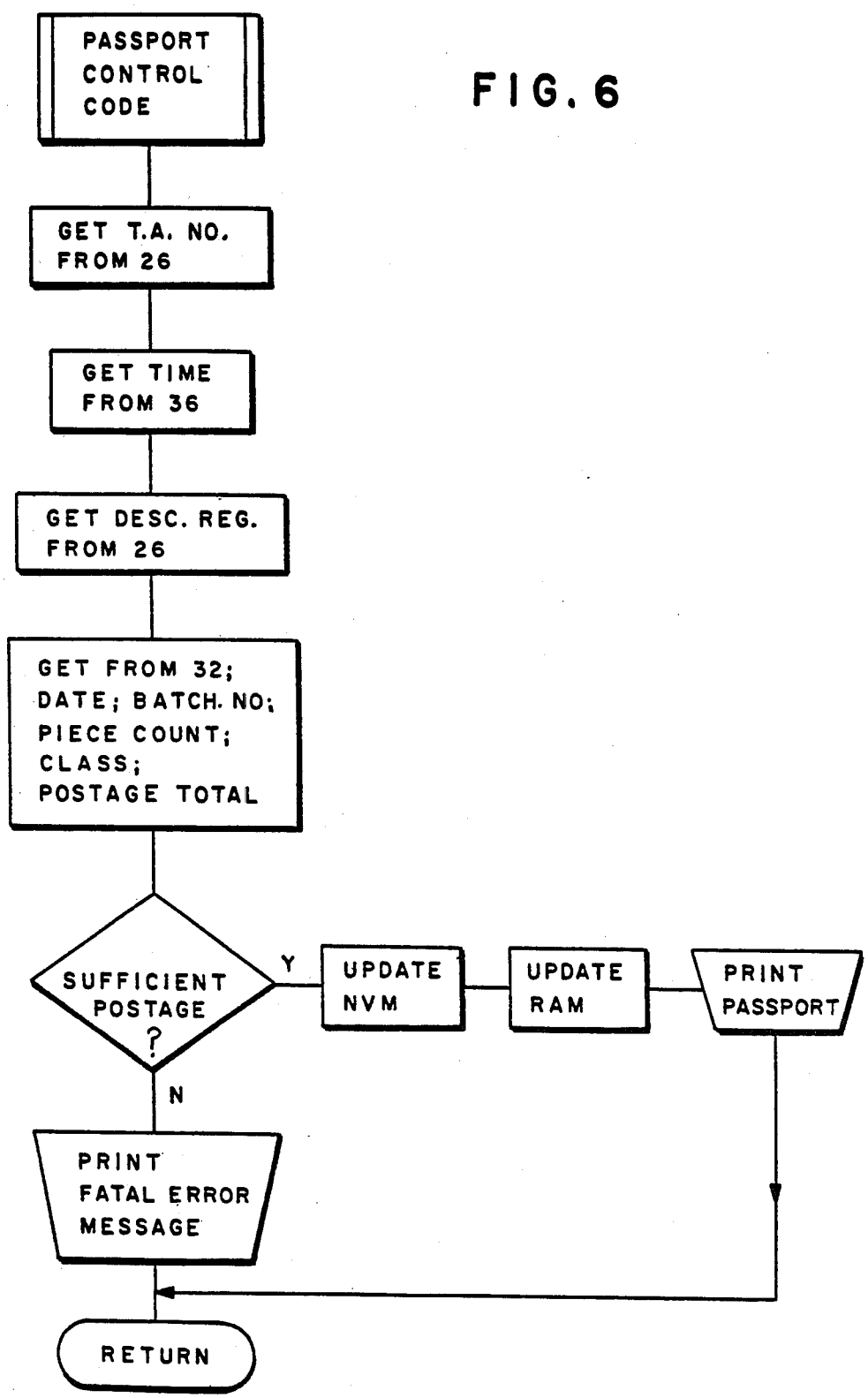

Referring now to FIG. 1, a batch mailing system is shown generally at 10 and includes a post office 12, a data center or central station 14 and a user location 16. The central station 14 has a processor 18. This processor 18 could be a main frame type of computer having substantial capacity. Communication is provided between the post office 12 and a plurality of central stations 14 (only one being shown) through a line or communication link 19 having a communication device such as a telephone type system 20 therein. Associated with the processor 18 and in connection therewith is a large storage memory unit 22 where large amounts of data can be stored and a register setting device 23 which includes encryption software of the type required in the resetting of postage meters remotely. Systems for the resetting of meters remotely are well known, see for example U.S. Pat. Nos. 3,792,446, 4,097,923 and 4,447,890.

A remote user location 16 has a secure accounting unit 25 which will hereafter be referred to as a "server". The server 25 is supplied by the central station 14 to the user and includes a user processor 24 which may be a processor of much smaller capacity such as an Intel 8085 processor available from Intel Corporation, Santa Clara, Calif. Connected to the processor 24 is a memory 26. Preferably the memory 26 will be a non-volatile memory (NVM). The user processor 24 is connected to the central station processor 18 through a communication link or line 28. A telephone type system 30 or other communicating device may be disposed within the line 28 to thereby provide selective communication between the processors 18, 24. Also connected to the processor 24 are a RAM 32, a ROM 34, an encryptor 35, a clock 36 and a sensor 37 whose respective functions will be described in detail hereinafter. An input/processor 38 is connected to the user processor 24 whereby data may be supplied, either manually or through a medium such as a coded paper, disc or tape, to the user processor 24 for the purpose of providing data required in the processing of mail pieces.

The server 25 has many characteristics of a postage meter as well as differences that will be discussed hereinafter. Although the invention is described as it applies to a server 25 specifically, it will be appreciated that the principles of the instant invention are applicable to postage meters having variable printing capability as well. Postage meters are mass produced devices for printing a defined unit value for governmental or private carrier delivery of parcels and envelopes. The term postage meter also includes other like devices which provide unit value printing such as tax stamp meters. Postage meters include internal accounting devices which account for postage value representation which is stored within the meter. The accounting device accounts for both the recharging of the meter with additional postage value and the printing of postage by the meter printing mechanism. Accordingly, postage meters must possess high reliability to avoid the loss of user or governmental funds stored within the meter and dispensed by printing postage.

A high speed inserter 39 is in electrical communication with the server 25 and performs the physical acts involved in processing the mail such as the inserting of inserts into envelopes, sealing the envelope flaps, orienting the mail pieces and conveying the mail pieces to a postage meter or printer. The term "insert" includes bills, advertising materials, notices, etc., which are of a size to be received within an envelope or the like. High speed inserters of this type are readily available commercially, as for example Inserter model No. 3100 series from Pitney Bowes Inc., Stamford, Ct.

A first printer 40 is in communication with the user processor 24 of the server 25 and with the input/processor 38 and is able to print upon mail pieces 42 such as envelopes containing inserts which it receives from the inserter 39. This printer 40 is one provided by the user and will be an unsecured, high speed printer which may be controlled either through the processor 24 or input/processor 38. A second printer 44 is provided to print upon a statement sheet 46 or other document. This second printer 44 is preferably a secure printer that is provided by the central station 14. Obviously, the second printer 44 can be an unsecured printer but this occasions greater risk in terms of verifying payment of postage. Throughout the balance of the specification and claims this statement sheet 46 will be referred to as a "passport". Details of the passport 46 will be described hereinafter in conjunction with FIG. 2.

Although only one user location 16 is shown and described, it will be appreciated many user locations will be serviced by the one central station 14 as for example through multiplexing. The central station 14 may be the location of a postage meter manufacturer or other accountable organization.

In operation, the user of the user location 16 will be given a identification number by the central station 14 that will be placed in the NVM 26 of the server 25. This identification number will be permanent and unique for each server 25 and the user will have no access to that portion of the NVM 26 that stores the identification number. It will be appreciated that this feature may be applied to postage meters as well. Having the identification number in memory 26 eliminates the need of having a plate applied to a postage meter or a server 25. It will be appreciated that a server 25 has many characteristics of a postage meter, i.e., security, a descending register and the like, but certain elements are absent. The most evident absent element is a printer, the advantage of which is described throughout. Another absent member is an ascending register. In a postage meter an ascending register is accessible only by a service representative of the meter manufacturer and may be used to determine if any meter tampering has taken place. Following installation of the identification number, the user will communicate with the central station 14 through the telephone 30 for the purpose of indicating to the central station 14 the amount of postage value it wishes to have accredited to its memory 26. An access code will be given to the user that is addressed to the setting device 23 through the touch dial of the telephone 30. Upon the receipt of the access code, the user will transmit to the central station 14 the proper code and identification number.

The setting device 23 will function to supply, or increase, the postage value in the memory 26. This memory 26 will include a descending register which is charged by the central station 14 with the selected amount of postage value. As the user location 16 processes mail, the postage value in the descending register will be decreased in accordance with the postage required to process the mail pieces. The amount of postage value applied to the memory 26 may be recharged automatically. For example, when the descending register attains a certain minimum postage value, a message is sent from the memory 26 to the processor 24. Upon receipt of the message, the processor 24 will automatically cause communication through line 28 with the central station 14 and request that additional postage value be charged to the descending register of the NVM 26. This would be carried out by the processor 18 in combination with the setting device 23. Upon completion of the recharging of the NVM 26 with additional postage value, the same would be stored in the memory 22. Devices for charging registers such as the descending registers are well known, as for example see U.S. Pat. Nos. 3,792,446, 4,097,923 and 4,447,890.

The balance of the server 25 includes the ROM 34 that contains a series of programs for controlling the functions of the server 25, a RAM 32 that will hold and supply real time data, a clock 36 that will provide the time and date, an encryptor 35 that will generate the code required for the descending register setting functions and a sensor 37 that will detect tampering with the server 25. The encryptor 35 can be any one of a number of encrypting devices including devices which use the Data Encryption Standards described in FIPS P4B 46, dated Jan. 15, 1977 and published by the U.S. Department of Commerce, National Bureau of Standards.

It will be appreciated that the printer 40 is a high speed, unsecured printer such as a ink jet printer or laser printer which will apply the addresses of the addressees including the zip code in bar code form 47, and addressor to the face of the mail pieces under command of the input/processor 38. In addition, other information can be printed by the printer 40 upon each mail piece 42 when under command of the processor 24. This information includes a transaction number (T.A. No.), the run of the particular batch of mail, the date and time of mailing, the class of mail and a batch number. The transaction number is that number assigned to the user location 16 by the central station 14 everytime postage value is added to the server 25 and will be stored in the NVM 26. This transaction number will be the same for one or more batches of mail that are sent and will remain until such time as the descending register of the NVM 26 is recharged with postage value, at which time a new transaction number will be assigned and stored in the NVM in place of the preceding transaction number. By changing the transaction number upon each recharge, an element is provided for verifying postage. The batch number is one assigned by the user through the input/processor 38 whereby a given batch of mail, i.e., mail of a particular type or character, will be identified by a number assigned by the user. In addition, a run number, which is a subset of the batch, may be given to identified particular segments of the batch.

When a batch of mail is to be sent, the user will supply mailing and verification information through the input/processor 38 into the user processor 24 which will transmit at least a portion of this information to the inserter 39. This information would include the number of mail pieces to be processed and number of inserts to be placed in each envelope 42. The time and date may be supplied to the printer 40 through the input/processor 38 by overriding the clocks 36. This is useful when future mail is being processed. The user processor 24 will then command the printer 40 to print the appropriate postage, time, date, transaction number, address on the mail pieces, and a zip code in bar code form 47 for a particular run. This run will be given a number that is associated with the particular mail to be sent, which number will be printed on the envelopes 42 of that run. As the printer prints the appropriate information upon each mail piece, the number of mail pieces and amount of postage required will be determined by the processor 24. At the end of the run or batch, the second printer 44 will print required information upon a passport 46.

Referring now to FIG. 2, the passport 46 is shown after having printed thereon the total postage (Post. Total) required to mail the batch of mail, the transaction number, piece count for a batch, descending register amount (Reg. Am.) after subtraction for the postage, the date, the time, the class, the batch number and the run. Additionally, the name of the server number identification number stored in the NVM 26, user name and any desired graphics can be printed. This information on the passport 46 serves many purposes. Firstly, the register amount acts as a physical record of the postage value stored in the descending register of the NVM 26. This amount is printed on the passport 46 on the upper right hand. The register amount will be that amount in the descending register after all postal charges have been made for the batch of mail to be sent. By placing this register amount on the passport 46 after the mailing of each batch, an ongoing, permanent record is maintained of the amount of postage value contained within the NVM 26. In this way, if there is a disaster wherein the server 25 is destroyed or the memory 26 therein is inadvertently erased, the user will still have a means for verifying the amount of postage value remaining from that amount of postage value originally purchased and stored. It should be expressly recognized that the printing of the descending register value has applicability beyond the concept of printing the descending value on passport after a group of mail has been processed. Specifically, it is within the scope of the present invention that the server 25, as well as postage meters in general, can be conditioned to print the value of the descending register, and any other data of interest such as the date and time of the day, after each imprint is generated. Thus, the present concept of printing the descending register value and other information of significance can be incorporated in servers 25 or postage meters without the use of other aspects of the present invention. The transaction number provides an authorization check as does the identification or server number. By changing the transaction number with each recharge of the server, one can readily determine if more postage accompanies a transaction number than is authorized. Also printed on the passport 46 will be the date and time the passport 46 is printed, the piece count, i.e., the number of mail pieces mailed in the particular batch, and the class of mail. Upon the printing of the information on the passport 46, the postage amount for the batch will be subtracted from the descending register in the NVM 26.

The information printed upon the passport 46 is transmitted to the central station 14 through the communication line 28 automatically after each batch, is processed so that a record is maintained through the processor 18 that communicates with memory 22. The memory 22 has an ascending register therein that corresponds to the descending register in the server 25, i.e., one is the inverse of the other. As is known, an ascending register is one that accumulates charges over a long term. Optionally, the memory 22 may have a descending register that duplicates the amounts in the descending register in the NVM 26 on an ongoing basis. By having the postage value contained within the memory 22 that corresponds to the value of the server 25, a check is constantly made to ensure that there is a correspondence between the passport 46 information and the amount of postage paid by the user. More specifically, the total amount credited to the user location 16 will be stored in memory 22 and if the amount in the ascending register exceeds that total amount the user location 16 will be notified that there are insufficient funds. When a batch of mail is sent to a post office, the passport 46 for that particular batch will accompany the mail. The postal employee can determine whether it is an authorized transmission of mail from the information contained upon the accompanying passport 46. If there is any question of the part of the postal service as to whether the information is authentic, it will contact the central station 14 and through the line 19 obtain the information from the central station 14 to verify the information contained on the passport 46. If this information is accurate, then the postal service will know that the mail is authorized, i.e., the postage for the mail has been paid. On the other hand, if there is any discrepancy, the postal service is able to act to ferret any fraud or correct any discrepancy. As is the usual practice in the use of postage meters, a user location 16 will send all its mail to an assigned post office.

Referring now to FIG. 3A, an envelope 42 is shown as it would be prepared by the present system 10. In the upper left hand corner is the address of the mail sender and the upper right hand corner a statement that indicates the class of mail and gives the identification or server number of the mail sender. This information may be preprinted on the envelopes 42 prior to processing of a batch. Such preprinting may be accomplished through interaction of the input/process of 38 in direct communication with the printer 44 without any participation of the other components of the user location 16.

In the processing of the batch mail the three address lines will first be printed with the name of the recipient, the street address then the city, state, zip code. The fourth line is then printed through information supplied by the processor 24 and this postage line, includes the postage amount $0.22, the date, Oct. 8, 1985 and the transaction number which in this case is C2J2743T56. Other information may be given on this postage line if so desired including the time the mail is processed. Although the postage line is shown in alpha-numerics it will be appreciated that the same may be printed in bar code and, optionally, bar code information may be printed on the envelope as desired. Upon the printing of the fourth line, a bar code will be printed at the bottom of the envelope 42 giving the zip code 47a, 47b.

Most U.S. post offices are equipped with bar code readers that read the postal service approved zip code in a bar-half bar code format at the lower portion of the envelope. The regulations for the form of bar-half bar code are published by the postal service in various publications such as "A Guide to Business Mail" Postal Forum XVIII, September 1984. This bar code will hereinafter be referred to as the postal bar code format. According to the postal bar code format, a five bit code is used including two "ones" and three "zeros". Referring now to FIG. 3B, the bar code format used by the U.S. postal service will be described as it applies to a zip code plus four. The bars represent a "one" bit and the half bars represent a "zero" bit. The first and last bars are start and stop bits and are always "ones", full bars. Between the start and stop bars are fifty bits representing ten words or numbers, i.e., zip+4. The first number, i.e., adjacent the start bar, consists of two bars followed by three half bars. This combination represents the word 11000 or the number 0 according to the postal service code. The next combination is the word 01100 or the number 6. These are followed by the numbers 7, 9 and 0 to give a zip code of 06790. The +4 numbers are 0,0,0, and 1. The last digit or number is a correction digit, selected so that the sum of the digits is always a multiple of ten. In this case the correction digit is 7. This results in the ten numbers being 0, 6, 7, 9, 0, 0, 0, 0, 1 and 7 which when added together equals 30. One of the requirements of the postal service code is that the ten digits when added equal a number that is a multiple of ten. Since 30 is a multiple of ten, the code is valid. When tampering is detected by the sensor 37, a message would be sent to the processor 24 indicating the presence of tampering and the processor 24 would control the printer 40 to print an invalid bar code format 47a on the envelope. This invalid bar code format 47a may take one of a number of forms. As illustrated, at least one of the five digits would contain a combination of ones and zeros different from the standard two "one's" and three "zeros". In the illustrated example, the first digit contains three "one's" and two "zeros" and the second digit contains one "one" and four zeros. Each of these is an invalid combination. Upon reading of the code by the post office bar code reader, the envelope 42 would be placed in a reject bin because of the invalid code reading. Envelopes 42 are occasionally placed in the reject bin, but when tampering is evident, all the mail pieces of the batch would be diverted to the reject bin and the postal clerk would be alerted that the user's server 25 has experienced tampering and would act upon this by notifying the appropriate authorities. The authorities then would visit the user location 16 and inspect the server 25 for evidence of tampering.

Although FIG. 3A shows a bar code format 47a that has been mutilated by altering the combinations of ones and zeros, other ways are available. The correction digit can be controlled so that the digits do not produce a sum that is a multiple of ten. Alternatively, the number of bits could be changed whereby instead of having a total of fifty-two bits, the number is greater or lesser.

The invention has been described as it applies to a bar-half bar code, but it will be appreciated that the principles of the invention will apply to the bar code formats of other countries as well. In Europe, for example, a code 3 of 5 is used. Such a code, or any other code, could be altered in such a way as not to be readily visually detectable while being rejected by the postal bar code reading equipment. It will be appreciated that the term "postal bar code format" is intended to include formats of other countries as well as that of the U.S. postal service.

The principles of the instant invention have been described in conjunction with use of a sensor 37. This sensor 37 could be a magnetic switch at a selected location or a number of such switches each of which is in communication with the processor 24. Devices other than a switch that could be used would include capacitance devices, photocells and the like.

Although an envelope 42 is shown that has the information printed on the face thereof the same scheme will apply equally well to a windowed envelope. A windowed envelope will be preprinted as previously described but instead of the printer 40 printing on the face of the envelope 42, an insert would be printed with the information such as that shown on the face of the envelope 42 in FIG. 3A and inserted so as to be viewed from the window. This would include a correct bar code format 47b or an invalid format 47a.

In this way what is provided is a method of allowing a organization to send large amounts of mail without having to frank every piece. In addition, the postal service is saved the problem of requiring on-site inspections at the user location 16 in order to verify that no unauthorized mail is being sent and that no tampering of the server 25 has taken place. By correlating the amount of postage, the transaction number, piece count, registration amount and the like, and reading of the bar code format 47b, verification can be made that the postage has been paid and there has been no tampering with the server 25. The central station 14 more or less acts as a bank representing the postal service and handles the funds on its behalf as well as maintains records for verification. The funds or postage value charged to the server 25 may be either pre-paid or charged to the user by the central station 14 on a credit arrangement. The central station 14 would be accountable to the postal service for the postage value placed in the server 25 on an immediate basis.

In a situation where tampering is indicated by the reading of an invalid bar code 47a, the post office would call the central station 14 to determine if the postage for the batch had been paid. If not, then the act of fraud will be evidenced and a postal inspector would be sent to the user location 16.

What is claimed is:

1. A system for detecting tampering with a postage value accounting unit, comprises:

means for sensing tampering of said postage value accounting unit and, in response to any sensed tampering, generating a signal;
   means for printing a code on a mail piece; and
   means, in communication with said sensing means and said printing means, for causing said printing means to print an invalid code on a mail piece in response to said signal.

2. The system of claim 1 wherein said printing means is caused, in response to said signal, to substitute said invalid code for a valid code.

3. The system of claim 1 further comprises:
   means for reading codes on mail pieces; and
   means, responsive to said code reading means, for separating mail pieces having invalid codes from mail pieces having valid codes.

4. The system of claim 1 wherein said means for printing includes means for printing in a postal bar code format such that said signal causes said printing means to print an invalid postal bar code format.

5. The system of claim 4 wherein said printing means is operative to print in a bar-half bar format.

6. The system of claim 5 wherein said processor, in response to a signal from said sensing means, is operative to cause said printer to print in a bar-half bar postal code format on a mail piece with digits having a sum that is not a multiple of ten.

7. A method of determining tampering on a postage value accounting unit within a postage system having sensors including a printer, said method comprising the steps of:

sensing tampering with said postage value accounting unit,
   printing a bar code in an invalid postage bar code format on a mail piece in response to the sensing of tampering; and
   determining the presence of tampering by inspection of said bar code.

8. The method of claim 7 further comprising the step of:

separating mail pieces with invalid codes from mail pieces with valid codes.

9. The method of claim 7 wherein the printing of said code includes printing in an invalid postal bar code format.

10. The method of claim 9 wherein said printing in said invalid postal bar code format includes the step of printing a bar-half bar code with digits whose sum is not a multiple of ten.

11. A method of determining tampering in a postage system having sensors and having a postage value accounting unit and a printer operative to print a code, said method comprising the steps of:

sensing tampering of said postage value accounting unit through the use of said sensors; and
    printing a code on a mail piece in response to the sensing of tampering.

12. The method of claim 11 wherein the step of printing said code includes printing in an invalid postal bar code format.

13. The method of claim 12 wherein said printing in an invalid postal bar code format includes printing a bar-half bar code with digits having a sum not a multiple of ten.

14. The method of claim 11 further comprising the step of:

reading said code on the mail piece thereby ascertaining the presence of said invalid code.

15. The method of claim 14 further comprising the steps of printing a valid code if no tampering is sensed and separating the mail piece with said ascertained invalid code from mail pieces with correct codes.

16. The method of claim 14 wherein the step of printing an invalid code includes the step of printing in an invalid postal bar code format on said mail piece.

17. The method of claim 16 wherein said printing in an invalid postal bar code format includes the step of printing a bar-half bar code with digits having a sum that is not a multiple of ten.

* * * * *